United States Patent [19]

Rogers et al.

[11] Patent Number: 4,458,451

[45] Date of Patent: Jul. 10, 1984

[54] TIRE UNIFORMITY MACHINE

[75] Inventors: Clarence L. Rogers, Hartville; Robert B. Duffey, Paulding, both of Ohio

[73] Assignee: The B. F. Goodrich Company, Akron, Ohio

[21] Appl. No.: 336,207

[22] Filed: Dec. 31, 1981

[51] Int. Cl.³ .............................................. B24B 49/16
[52] U.S. Cl. .................................................. 51/165 R
[58] Field of Search ........... 73/146; 51/165 R, 106 R, 51/DIG. 33

[56] References Cited

U.S. PATENT DOCUMENTS

| | | | |
|---|---|---|---|
| 3,574,973 | 4/1971 | Rader | 51/165.92 |
| 3,739,533 | 6/1973 | Iida | 51/165 R |
| 3,848,368 | 11/1974 | Toshioka | 51/165 R |
| 3,849,942 | 11/1974 | Monajjem | 51/165 R |
| 4,095,374 | 6/1978 | Ugo | 51/165 R |
| 4,112,630 | 9/1978 | Brown | 51/165 R |

*Primary Examiner*—Harold D. Whitehead
*Attorney, Agent, or Firm*—H. F. Pepper, Jr.; Joseph Januszkiewicz

[57] ABSTRACT

A tire uniformity machine where grinding is effected through electronics which compare the electrical output signals of tire variation sensor means to a percentage of the peak to peak variations of the signals.

5 Claims, 3 Drawing Figures

4,458,451

TIRE UNIFORMITY MACHINE

BACKGROUND OF THE INVENTION

In the art of tire making, it is the practice to test and correct tires for radial force variations after they have been cured. The cured tires are placed in a uniformity machine and rotated while in the inflated condition. While rotating, each tire will contact and rotate a wheel to simulate road conditions. The force between the rotating tire and the road wheel, simulating road conditions or tire load, is set to a predetermined value and then force variations between the tire and the road wheel are sensed. The sensed force variations in the load are sent in the form of electrical signals to an electronic package which can then operate grinder wheels to remove patches of rubber from the tire corresponding to those locations in the tire which exhibited undesirably high values of force when measured on the load wheel. This selected grinding removes hard spots from a cured tire to make the tire more susceptible to providing a constant or smooth ride when the tire is used on a vehicle under highway conditions. Without the removal of rubber from the tires during this process, the high force areas of hard spots of the tire would result in an uneven ride to the user of a vehicle employing the tire.

DESCRIPTION OF THE PRIOR ART

In the prior art as described for example in U.S. Pat. No. 3,574,973 issued 4/13/71, to Edwin R. Rader, there is described a machine typical of commercially available tire uniformity correction machinery. According to that disclosure, an inflated tire is mounted for rotation about a vertical axis. Parallel with that first vertical axis is a road simulation wheel mounted for rotation about a second axis, parallel to the first, with the road wheel adapted to contact and be rotated by the rotating tire. Sensors associated with the road wheel determine when hard spots or high force areas of the tire are rotated into contact with the road wheel since increased force is sensed at the road wheel. Conversely, lower force areas or soft spots on the tire will also be detected by the force sensors associated with the road wheel.

The electrical output signals from the sensors is fed through an electronic package which will evaluate the sensed information to drive the grinding wheels into contact with the shoulders of the rotating tires at predetermined times. The grinding wheels will then grind the appropriate patches of rubber from the tire until sufficient rubber has been removed from the hard spots of the tire to render the tire sufficiently devoid of high radial force variations and thus providing improved tire performance.

The electronic packages of prior art devices have been configured to interpret the output from the sensors in several manners.

According to the aforementioned Rader disclosure, each hard spot on the tire during one revolution of the tire will contribute to producing a composite electrical signal. The grinding wheels are actuated to be pulsed into contact with the tire each time a spot of excessive hardness on the tire is adjacent the grind wheels.

The above general description of signal flow and processing into the grind comparitor is inclusive of those variances in implementation which are discernable by the trained technician or engineer. For instance the percentage peak to peak input, the peak input and the force variation signal may be summed and compared in a number of ways with inverting amplifiers and using either hard spot peak or soft spot peak at the inverting and noninverting inputs to comparing amplifiers as understood in current analog operational amplifier technology.

Another variation in the grinding to tire uniformity is the sensing of the first harmonic of the signal sensed at the road wheel. In this harmonic approach, as compared with the composite approach, the output signal from the road wheel is first filtered following the output of a summer amplifier. The filtered signal is at the frequency of the tire rotation and corresponds to the fundamental component of the Fourier series which represents the composite force variation. Thereafter the output may be compared as in the above referred composite systems. This harmonic approach creates a sine wave which is termed the radial fundamental force variation. The most significant difference, however, is that the grind wheels function only one time during each rotation of the tire.

In all of the prior art approaches, whether in the harmonic or composite approach, the patch length of rubber removed will vary during each revolution of a tire being corrected. The grind will be nominally centered on and inclusive of the hard spot or spots of the tire being ground. Further in all of the prior art approaches, grinding occurs with reference to a level which is a constant difference from either the hard spot or the soft spot.

SUMMARY OF THE INVENTION

The present invention is directed to a tire uniformity machine wherein the grinding is effected through an electronic package which compares the electrical output from the sensors at the road wheel to a predetermined level between the force corresponding to the tire hard spot and soft spot. The difference in force between the tire hard spot and the tire soft spot is called the peak to peak radial force variation. This is the nomenclature of the value which is normally specified by the user. The predetermined level is obtained by taking a constant percentage of the peak to peak variation and referencing it to the value corresponding to either the hard spot or the soft spot. This new reference level in the electrical package can be utilized in either the composite or harmonic approaches or both in sequence.

When this approach of the instant invention is employed in the harmonic mode, a constant angle or patch length of rubber will be removed for each rotation of the tire and will continue until the predetermined tire uniformity has been achieved. This constant angle is optimum at 180° in the harmonic mode and would correspond to a constant percentage of 50%.

When this approach of the instant invention is employed in the composite mode, as well as in the harmonic mode, referencing is always to a constant predetermined percentage of the peak to peak value referenced to either the hard spot or the soft spot. It is obvious that the 180° grind path is not necessarily obtained when in the composite mode. The chief advantage of this method of reference level determination in the composite mode is that grind reference is always positioned between the hard spot and the soft spot. One of the attributes of this method is that grind correction can be obtained to very low values of peak to peak force variations. In comparing this tire uniformity correction technique with that obtained with prior art devices, the present invention results in reducing scrap tires occuring as the result of excessive grinding during force correction. Further, with less rubber being removed, the cosmetic appearance of the tire is improved and the user of the tire will be able to experience more driving mileage. Further, less wear on the mechanical components of the machinery occurs with each use of the tire uniformity machine thus extending its life. Further, a tire is processed more rapidly whereby cost savings in tire fabrication are realized and processing machinery requirements are reduced.

DETAILED DESCRIPTION OF THE INVENTION

The above objects of the invention as well as other objects and further features thereof will become apparent upon a review of the detailed description of the invention, when read in association with the accompanying claims, wherein, FIG. 1 is a side elevational view of a tire mounted on the tire uniformity machine of the instant invention with associated mechanical parts shown in association therewith.

Figure 1:
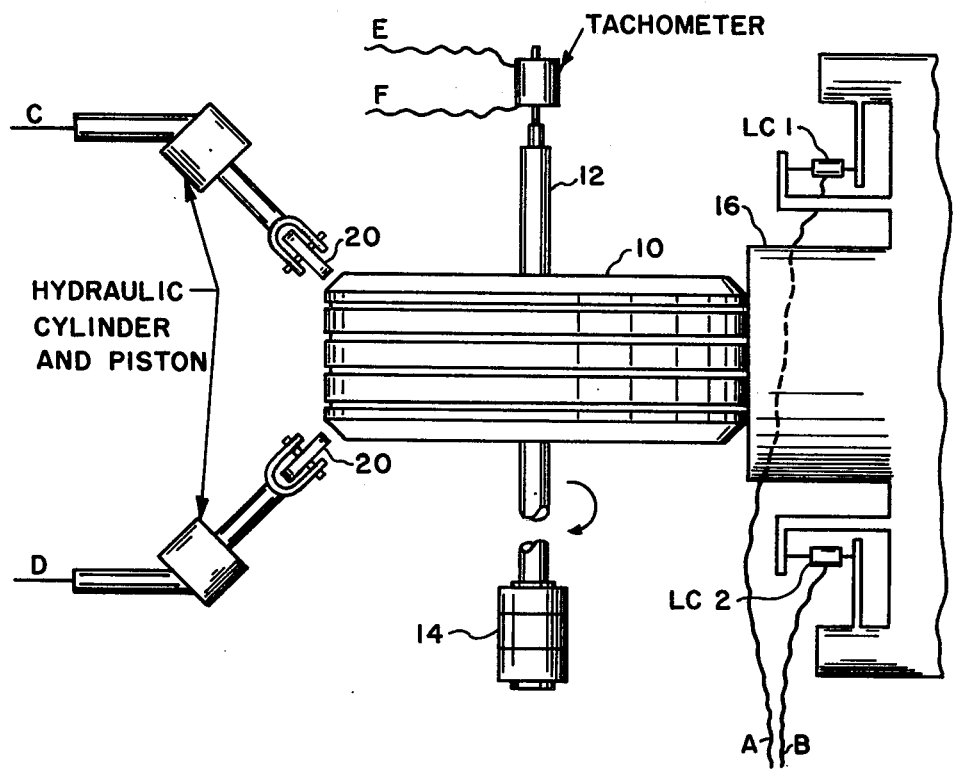
Figure 2:
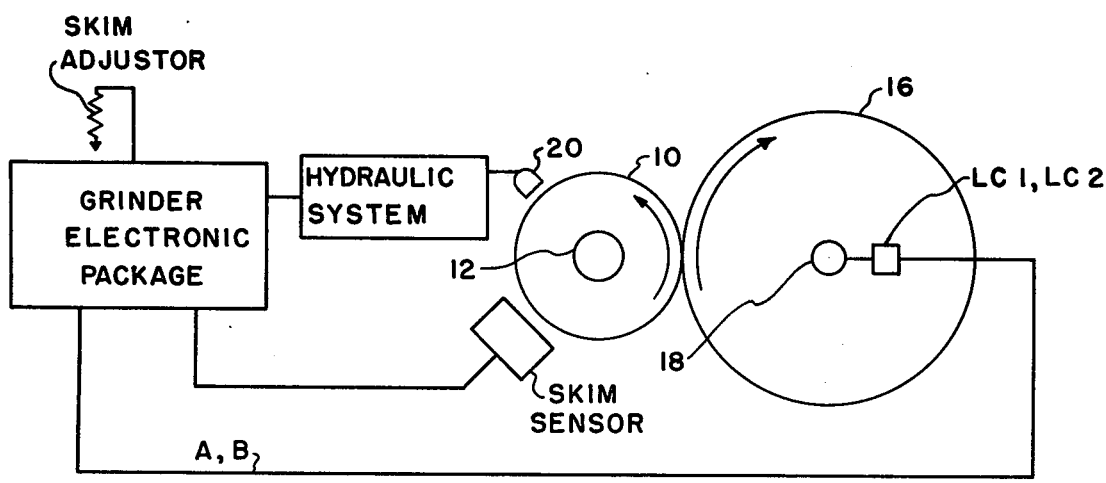
FIG. 2 is a schematic top view illustration of a tire under loaded conditions.

With reference to the preferred embodiment, as shown in FIG. 1, there can be seen a tire 10 mounted for being positioned on a shaft or spindle 12 for rotation about a fixed vertical axis. Motion is imparted through an associated motor 14. Positioned adjacent is the road wheel 16 adapted for rotation about an axis spaced from, but parallel with, the axis of rotation of the tire. The shaft 18 upon which the road wheel rotates is adjustably mounted so that it may be positioned closer to or further from the axis of rotation of the tire. In this manner a predetermined force or load may be set up between the tire and the road wheel. During setup an operator will place the tire upon rims mounted to its shaft 12 and then position the road wheel in contact with the tire until a predetermined load or force exists therebetween as determined by the load specification for that tire. This is typically input to the system by the load potentiometer. The road wheel is then locked into position at the predetermined load at a fixed distance from the axis of rotation from the tire. The rotation of the tire and consequent rotation of the road wheel simulates the forces of the road upon the tire. As force variations corresponding to different rotational positions of the tire occur, they will increase or decrease the force load between the tire and the road wheel. These force differences are sensed by load cells LC1 and LC2 operatively coupled with the road wheel. The output from the load cells is then fed to the electronic package via lines A and B.

The output from the load cells is connected through lines A and B to the inventive electronic package and then to a hydraulic system through lines C and D which moves or pulses the rotating grind wheels 20 against the outside ribs of the tire tread. The absolute position of the grind wheels is determined by the closed loop function of the electronics package in conjunction with the position sensor, the hydraulic system and an external skin adjustor which permits adjustment of the grind wheel position to skim at a predetermined distance relative to the tire tread surface. The electronics package further determines the areas of the tread which shall require rubber removal through analyzing the force variation obtained from the load cells. The electronics package also provides the signals to the hydraulic system such that the rotating grind wheels are positioned a predetermined distance towards and into contact with the tire ribs at each point or area where it is determined that rubber should be removed.

Signals from the tachometer control the operation and timing of the shift register to insure that grind locations on the tire are appropriately delayed such that action of the hydraulic system is related to these grind locations on the tire as they are brought into position by rotation of the tire on the spindle.

For all practical purposes, the aforementioned parts of the tire uniformity correction machine are the same as that described with respect to the prior art, including that to Rader referred to hereinabove.

Figure 3:
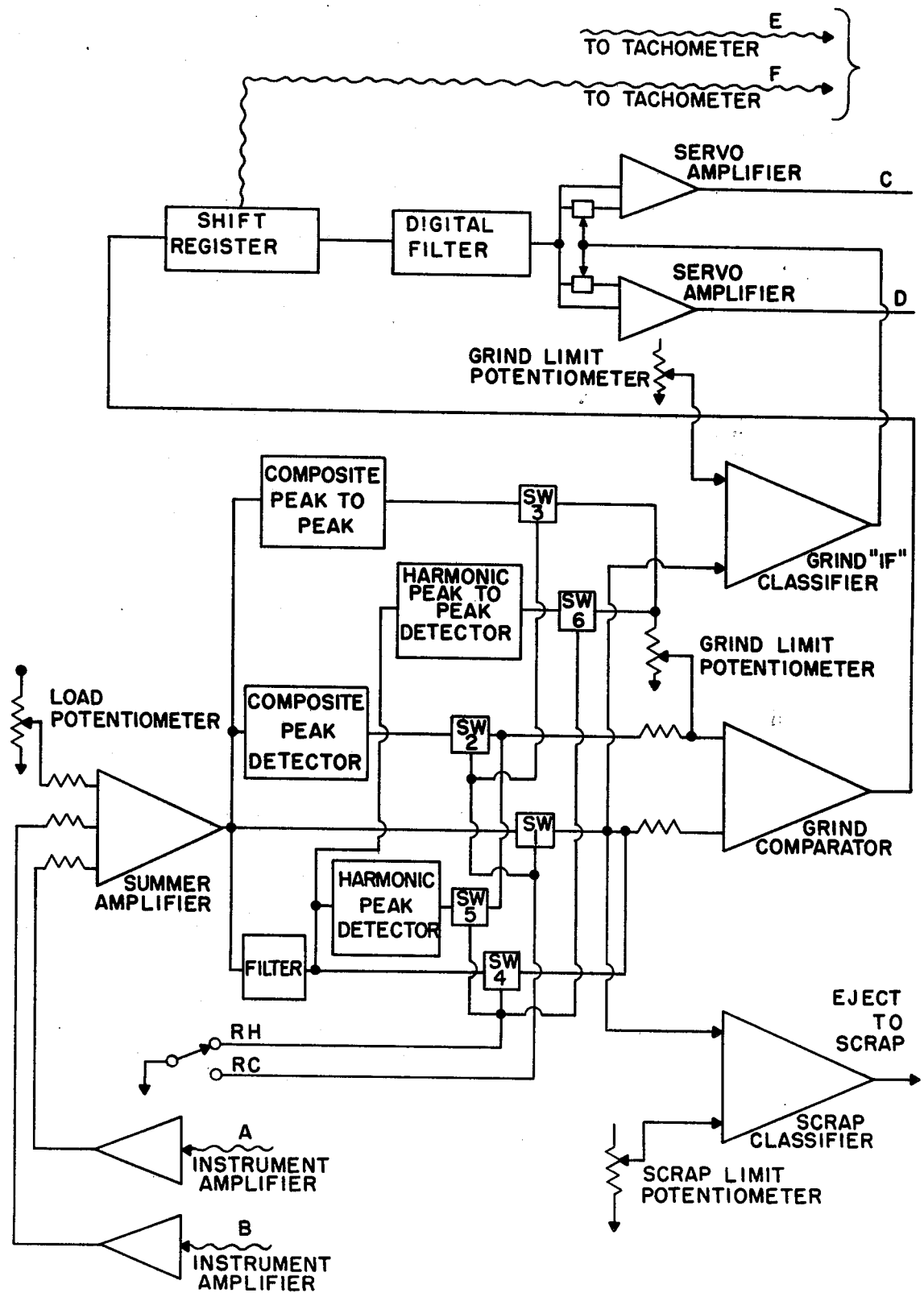
FIG. 3 is a schematic block diagram of the preferred electrical package for carrying out the instant invention.

The heart of the present invention is new electronics circuitry located in the electronics package for determining the output of the grind comparator from the inputs to the summer amplifier. According to the present invention an operator or control system must first select the mode in which operation is desired. This could be in the radial harmonic mode or the radial composite mode or in the sequential use of both of these. In the radial composite mode selection is made of the RC position as shown in FIG. 3. This would actuate switches 1, 2 and 3. Switches 4, 5 and 6 would be inactivated so that signals could not pass therethrough. With signals capable of moving through switches 1, 2 and 3, the output from the summer amplifier would take a plurality of paths. The summer amplifier receives its input from lines A and B from the load cells of the road wheel. These input signals from A and B pass through instrumental amplifiers and series resistors prior to being fed to the summer amplifier. The output from the load potentiometer is likewise passed through a resistor into the summer amplifier. The output from the summer amplifier creates a composite signal, which in the composite mode passes directly, through one line including switch 1, to the grind comparator through its series resistor. Alternate paths to the grind comparator pass the composite signal through both the composite peak detector and the composite peak to peak detector through switches 2 and 3 respectively. The output from the composite peak to peak detector also passes through a constant angle adjustment potentiometer before summing with the output of the composite peak detector at the input grind comparator amplifier. The grind comparator compares the direct output from the summer amplifier with the combined output from the composite peak detector and composite peak to peak detector, hereinafter called the comparator reference signal, to issue a grind signal whenever the direct composite signal exceeds the comparator reference signal. The output will then provide a grind command signal whenever the direct composite signal exceeds the comparator reference signal as received from the composite peak to peak detector through the constant angle adjustment potentiometer and the composite peak detector. A grind command signal will thereby be generated for rubber removal. The action of the constant angle potentiometer in the composite mode is to position the grind reference level to the hard spot at one end of the potentiometer wherein the grind wheels are not positioned against the tire at any point on the 360° circumference.

When the constant angle potentiometer slider is positioned at the other end of the potentiometer, the grind reference level is referenced to the soft spot and grinding will occur on the complete 360° circumference of the tire.

A setting of midpoint on the constant angle potentiometer when in the composite mode will cause grinding to be enabled whenever the force variation signal is greater than 50% of the peak to peak value.

In the harmonic mode the selector switch is positioned in the RH orientation to activate switches SW4, SW5 and SW6. Switches SW1, SW2 and SW3 would be activated precluding the flow of intelligence carrying information through the radial composite lines as described above. In the radial harmonic mode, as in the radial composite mode, the outputs from the load sensors are fed to a summer amplifier through their respective instrument amplifiers and the series resistors. Coupled with this is the output from the load potentiometer that is selected by the operator to satisfy the test requirements for the tire. The composite signal is then directed onto various paths. The first path is through a filter, shown as 1 Hertz, having an output which is the fundamental component of the Fourier series which can be used to represent this composite signal. The output from this filter is carried through switch 4 through a series resistor into the grind comparator for being compared with the signal from the harmonic peak to peak detector and the harmonic peak detector. The output from the summer amplifier is also passed from this filter through two alternate paths. The first path is through the harmonic peak detector through switch D through a series resistor. Prior to being fed into the grind comparator the output from the filter also is connected through the harmonic peak to peak detector through switch 6 and through the constant angle adjustment potentiometer for being fed jointly with the output from the harmonic peak detector. This creates a combined output to the grind comparator for comparison with the direct output from the filter. Whenever the direct output from the 1 Hertz filter exceeds the combined output from the harmonic peak detector and the harmonic peak to peak detector a grind command signal is generated to actuate the grinding wheels for removal of the patch of rubber.

Since this harmonic mode results in a sine wave, a single patch is removed for each rotation of the tire as compared to the multiple patches removed from the tire in the radial composite mode. Further, when in the radial harmonic mode, the patch is of equal length on both sides of the hard spot of the tire. And since the patch removal is a percent of the peak to peak variation, a constant angle patch will be removed during each movement of the grind wheels. When the constant angle grind potentiometer is positioned at the midpoint between the hard spot and the soft spot, a 180° grind patch length is obtained. This 180° grind patch is optional for first harmonic force reduction.

While the invention is disclosed with regard to edge grinding, full face grinding could readily be used to achieve the correction of force variations.

In various versions of tire uniformity machines which are current state of the art, shoulder grinders or face grinders are used to correct composite runout and/or fundamental runout of the tire in the same manner as described above for radial force variation.

The radial force variation circuity is either shared by appropriate switches or separate circuitry and/or components which are used for runout composite and/or first harmonic correction.

The above presented discussion of correction for radial force correction may be repeated for radial runout correction, the only difference being that a runout sensor is input to the summing amplifier rather than load cell outputs.

Operation for efficient grind correction of radial runout by shoulder or center grinding occur exactly as in the force variation correction circuitry described above.

What is claimed is:

1. Tire uniformity correction apparatus including drive means to rotate an inflated pneumatic tire having a tread around its rotational axis, sensor means to measure force variations in the rotating tire and to produce electrical signals therefrom, means to load the tire to effect rotation of the tire under loaded conditions whereby said sensor means may detect radial force variations, grinding means to remove material from the tread to predetermined minimum acceptance levels and circuit means having amplifier means to provide a closed loop means to amplify the electrical signals produced by the sensor means to produce amplified signals, summer means to sum the amplified signals with a preset signal to produce a first variation signal, means to produce a second variation signal of variable voltage which is a constant percentage of peak to peak radial force variations in said first variation signal, means to compare such first and second variation signals to produce a grind command signal whenever the first variation signal exceeds the second variation signal and means to actuate said grinding means over a grind path portion of said tread which grind path portion is the same percentage of said tread as said constant percentage of said peak to peak variations.

2. The apparatus as set forth in claim 1 wherein the signal from the summer amplifier is filtered to separate a particular Fourier component from the signal to thereby grind in the harmonic mode.

3. The apparatus as set forth in claim 1 wherein said signal from the summer amplifier is unfiltered to thereby grind in the composite mode.

4. The apparatus as set forth in claim 1 and further including a filter and a selector to send the signal from the summer amplifier through the filter to thereby grind in the harmonic mode or to bypass the filter to thereby grind in the composite mode.

5. The apparatus as set forth in claim 2 wherein the circuitry is set to compare the first variation signal to a second variation signal of 50% of the peak to peak variation to render the grind to a constant 180° patch removal.

* * * * *